United States Patent [19]

Lin

[11] Patent Number: 4,573,001
[45] Date of Patent: Feb. 25, 1986

[54] COIL DENSITY MODULATION

[76] Inventor: Banchien Lin, 4th Floor, No. 2, Lane 192, Szu-Wei Rd., Taipei 106, Taiwan

[21] Appl. No.: 540,505

[22] Filed: Oct. 11, 1983

[51] Int. Cl.$^4$ .............................. H02P 6/00; H02P 8/00
[52] U.S. Cl. ..................................... 318/695; 318/685; 318/696
[58] Field of Search ............... 318/695, 696, 704, 360, 318/361, 439, 685; 310/111

[56] References Cited

U.S. PATENT DOCUMENTS

| | | | |
|---|---|---|---|
| 1,553,374 | 9/1925 | French | 318/695 |
| 3,028,530 | 4/1962 | Gavreau et al. | 318/695 |
| 3,139,547 | 6/1964 | Shafranek et al. | 318/696 |
| 3,402,334 | 9/1968 | Newton, Jr. | 318/696 |
| 3,838,322 | 9/1974 | Grenwell | 318/810 |

Primary Examiner—David Smith, Jr.

[57] ABSTRACT

A Coil Density Modulation (CDM) for the control of alternating current motors which controls the speed of the rotating magnetic field produced in the armature of the motor controlled. The magnetic flux wave components produced in the phases of the motor armature having the sine-approximated waveforms are synthesized by controlling the number of parallel turns of coils of the armature phase winding that are activated to produce magnetic flux by connecting them to a DC power source in sequences disclosed. Also the mechanical and electronic devices for the disclosed CDM method of motor speed control, together with the CDM motors for the CDM drive systems.

10 Claims, 19 Drawing Figures

COIL DENSITY MODULATION

This invention relates to a Coil Density Modulation method and its related mechanical and electronic devices for controlling the speed of motor. It controls the speed of motor by controlling the number of subwindings in each phase of the motor armature which are switched on to a fixed-voltage direct-current power source. By switching the subwindings on and off in proper sequences, stepping sine-approximations of magnetic flux waves are synthesized in the phases of motor armature which result in a rotating magnetic field that propels the motor.

TECHNICAL FIELD

The synchronous speed of synchronous and induction motors is directly proportional to the frequency of the applied power source. Speed control of these motors is obtained by supplying the electric power from an adjustable-frequency power unit to the motor stator. This kind of motor speed control is generally referred to as AC variable-frequency control.

BACKGROUND OF THE INVENTION

Two commonly used thyristor AC variable-frequency drive methods are the six-step method and the pulse width modulation (PWM) method.

The six-step method first converts the 60-Hz line voltage to an adjustable-voltage direct current. This DC voltage is then fed to an inverter which, by a rapid switching operation, applies an alternating square-wave voltage to the terminals of a 3-phase AC motor. The resulting motor line current is a scalloped version of a sine wave. This current, flowing through the motor winding, produces an alternating six-step voltage from line to neutral, from which the method gets its name.

A pulse width modulation system rectifies 60-Hz line voltage to produce a constant potential DC voltage. This DC voltage is then broken by the PWM inverter into alternating groups of short pulses in a pattern that, when applied to an AC motor, produces a ragged sine-wave current. One such PWM system produces pulses at a fixed rate. In that system, the voltage and the wave shape are determined by variations in the pulse length as each cycle progresses. A second system produces a fixed number of pulses per cycle, in which case the voltage is determined by the length of each pulse. The wave is shaped by variations of the time between pulses during each half cycle. The frequency, in both cases, is determined by the rate of polarity reversals. There are also other PWM systems.

In short, both the six-step method and the PWM method run the motor by providing the suitable sine-approximated voltages to the motor stator armature to result in a rotating magnetic field running at certain frequency, the motor is thus controlled to run at a speed determined by that frequency.

The rotating magnetic field produced in the motor stator armature winding is the working element of alternating current motor which results from the applied suitable electric power source. Together with the magnetic field produced by the rotor either from a permanent magnet or from a field winding in the case of a synchronous motor, or from the induced rotor cage in the case of an induction motor, a torque is produced to propel the motor.

SUMMARY OF THE INVENTION

This invention concerns a method and devices designed according to the principles of that method for the control of motors. The method is referred to in this specification as "Coil Density Modulation" method, or abbreviated as "CDM" method.

The Coil Density Modulation is a method that produces a rotating magnetic field in the armature winding of the motor being controlled. This kind of motor control is generally reffered to as AC variable-frequency control, which conventionally includes such as six-step and pulse width modulation (PWM) controls.

AC variable-frequency drive systems have been widely used, which perhaps is because of the most important fact that motors of this kind, that is, the AC polyphase motors, always have the highest power to weight ratio. The CDM motors designed according to this invention also are motors of this alternating current type, and they are also controlled by controlling their rotating magnetic fields, however, the strategy of producing the required rotating magnetic field for them is completely different from that for the conventional AC variable-frequency drive motors.

The difference between the CDM strategy and the prior art is that the CDM strategy of this invention controls the number of parallel single-turn coils or parallel equal-number multi-turn coils of the motor armature that are switched on to a constant-voltage DC power source, while the prior art controls the values of the voltages applied to the phase terminals of motor armature. Therefore, the method of constructing a CDM motor will be far different from that of the prior art. Accordingly, the conventional AC variable-frequency control will be referred to in this specification as "Coil Voltage Modulation", or, "CVM" as abbreviated, to distinguish from the CDM of this invention, because "CVM" of the prior art controls the power source voltage for the motor armature, while the "CDM" of this invention controls the density of the activated coils of the motor armature.

The major object of the CDM method of motor control is to promote the drive system performances by producing much better sine-wave approximations for the magnetic flux waves in the phase windings of the motor armature, which will be described in detail below.

BRIEF DESCRIPTION OF THE DRAWINGS

This invention will become more readily apparent, from the following exemplary descriptions, taken in conjunction with the accompanying drawings, in which.

DETAILED DESCRIPTION

The rotating magnetic field produced in the stator armature is the basic element for alternating current motors to run. The magnetic field that rotates under control is usually synthesized from two or more components which are each generated by one of the two or more respective phase windings of the stator armature. Each component of the magnetic field is a magnetic flux wave that varies its strength as the magnetic field rotates which, when expressed as a function of time, should be an approximation of sine function. The better the approximation to a true sine wave, the better the efficiency of the motor.

The magnetic flux produced in a phase winding is a result of the electric current flowing in the coils of the phase winding. A phase winding for the motor armature in its role is simply equivalent to an electromagnet, while for an electromagnet, the magnetic flux produced by it can generally be expressed as $$H = ni \quad (1)$$

where n is the total number of turns of coil of the electromagnet, i is the current flowing in the coils, and H is the magnetic field intensity produced by the electromagnet.

More than one electromagnet can be combined to form a larger electromagnet. Regardless of how the electromagnets are powered by different or same power sources, the resultant magnetic field intensity is strictly the sum of the magnetic field intensity produced by each basic electromagnet.

For example, if ten identical electromagnets each having a resistance r are connected in parallel to one direct-current power source with voltage v, the resultant magnetic field intensity $H_P$ will be equal to a magnetic field intensity $H_S$ produced by the large electromagnet obtained by connecting the same ten basic electromagnets in series. In the series case the total resistance becomes 10r, and it is connected to a direct-current power source with voltage 10v. The current flowing in each of the ten basic electromagnets of the parallel case is $v/r = i$, which equals the current that flows in the large electromagnet of the series case, $10v/10r = i$. The resultant magnetic field intensity of the parallel case is $H_P = 10 * n i$, while for the series case, $H_S = 10 n * i$, the resultant magnetic field intensities are of the same magnitude.

Generally, as can easily be comprehended, for a "bulk electromanet", the magnetic field intensity produced can be expressed as $$H = n_1 i_1 + n_2 i_2 + n_3 i_3 \ldots = ni \quad (2)$$

where subscripts 1, 2, 3, and . . . designate the discrete basic electromagnets that may each be powered by a different power source. Of course, "bulk" means that the complete electromagnet is composed of a plurality of "basic" electromagnets.

It can be observed from Eq.(2) that if the value of H must be controlled to be a time function that approximates the required sine function, then there are two variables to control with, namely, n, the number of turns of coils of the discrete basic electromagnets, and, i, the current that flows in the coils of the discrete basic electromagnets. Both n and i can be controlled at the same time or, only one is controlled as is the case of the conventional AC variable-frequency control, in which i, the current in the coils, is the controlled element.

On the other hand, n can be the controlled element as is disclosed by this invention. Controlling n instead of i results in certain important advantages, which makes this invention superior.

If the i's in Eq.(2) are made equal for all the basic electromagnets, and kept to be the uncontrolled constant value, and take n as the controlled one, then Eq.(2) can be revised as $$\begin{aligned} H &= n_1 i + n_2 i + n_3 i + \ldots \\ &= (n_1 + n_2 + n_3 + \ldots)i \\ &= ni \end{aligned} \quad (3)$$

in which i is constant and n is variable. If n is controlled as a function of time that approximates the sine function, then H will also approximate the sine function. This is the basic concept of this invention, and the method derived for the control of motors is accordingly called the "Coil Density Modulation" or abbreviated "CDM", because the control is taken against n, the number of coils activated out of the total number of coils in the phase winding.

The Coil Density Modulation of this invention, its objects, and advantages should be more apparent after the description of the devices used for fulfilling the Modulation which are given below.

The synchronous or induction motors constructed according to this invention for the CDM method of speed control are different from motors for conventional thyristor drives. All the single-turns in each phase of the armature winding are connected in series for conventional motors, while for CDM drive motors, the winding in each phase is divided into a number of several subwindings. These subwindings, whether or not they all have the same number of parallelly connected single-turns, can be said to function parallelly. When certain numbers of subwindings in a phase are connected in parallel to a DC power source at different instances in a cycle, different total numbers of parallelly connected single-turn coils in the phase will be activated to produce the magnetic flux. It is the total number of single-turn coils connected in parallel to the DC power source that must be approximated to be a sine function of time, so as to make H in Eq.(3) to also approximate a sine function of time.

Figure 1:
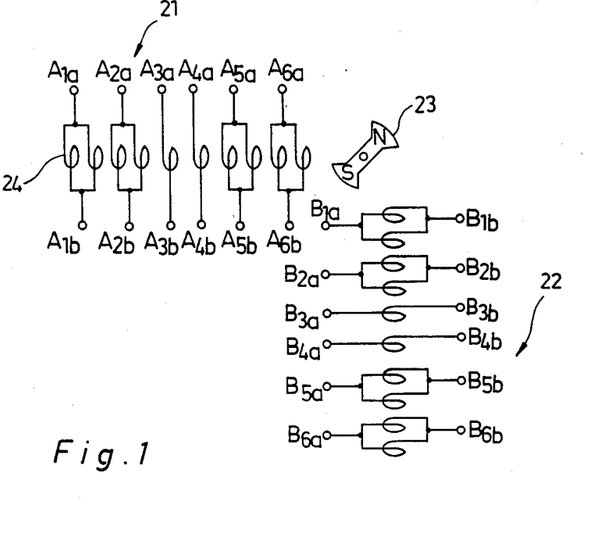
FIG. 1 is an illustrative diagram showing an exemplary synchronous CDM motor designed according to this invention.

The above-described differences of the CDM motors as compared to the conventional motors are observed in FIG. 1.

FIG. 1 depicts the CDM motor of a CDM drive system which is a simple illustrative diagram. This exemplary motor is a synchronous CDM motor having an armature winding with two phases 21 and 22, and a permanent magnet rotor 23. As compared to a conventional synchronous motor having in each of its phases all the ten turns of coil (in this example) connected in series, this CDM motor has in each phase all the ten turns of coil divided into six subwindings, each subwinding 24 has two terminals, which terminals are labeled as A1a to A6a, A1b to A6b and B1a to B6a, B1b to B6b as are shown in FIG. 1. Each terminal is connected to the segment of the mechanical CDM commutator, with the same labeling of that segment as of the terminal. Notice that in the six subwindings, the six numbers of single-turn coils connected in parallel are arranged as 2, 2, 1, 1, 2, and 2 for A1, A2, A3, A4, A5, and A6 subwindings respectively, and the same for B1, B2, B3, B4, B5, and B6 subwindings respectively.

Figure 2:
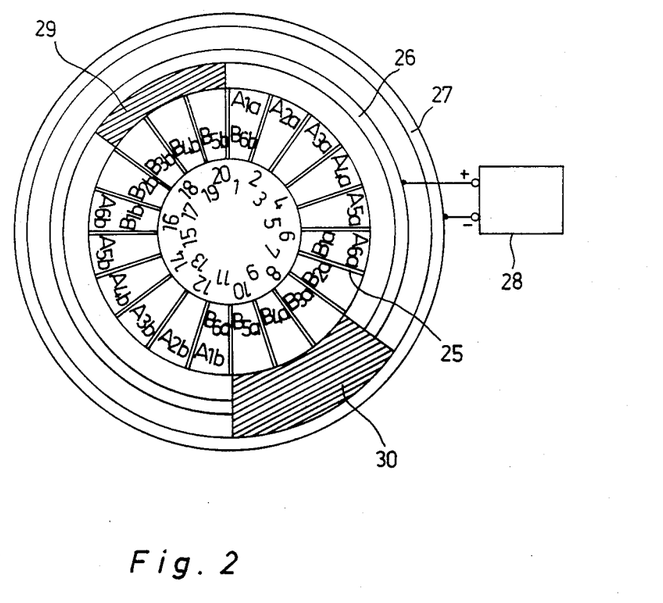
FIG. 2 is an illustrative diagram showing an exemplary mechanical CDM commutator designed according to this invention to match the motor of FIG. 1, together with a pair of two brushes and a power unit.
Figure 3:
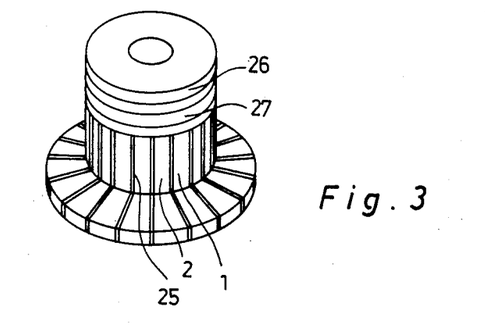
FIG. 3 is a perspective view of a mechanical CDM commutator designed according to this invention.
Figure 4:
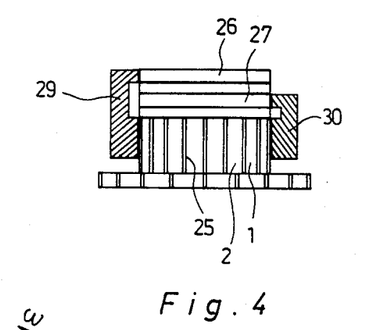
FIG. 4 is a side view of a mechanical CDM commutator designed according to this invention, together with a pair of brushes.
Figure 6:
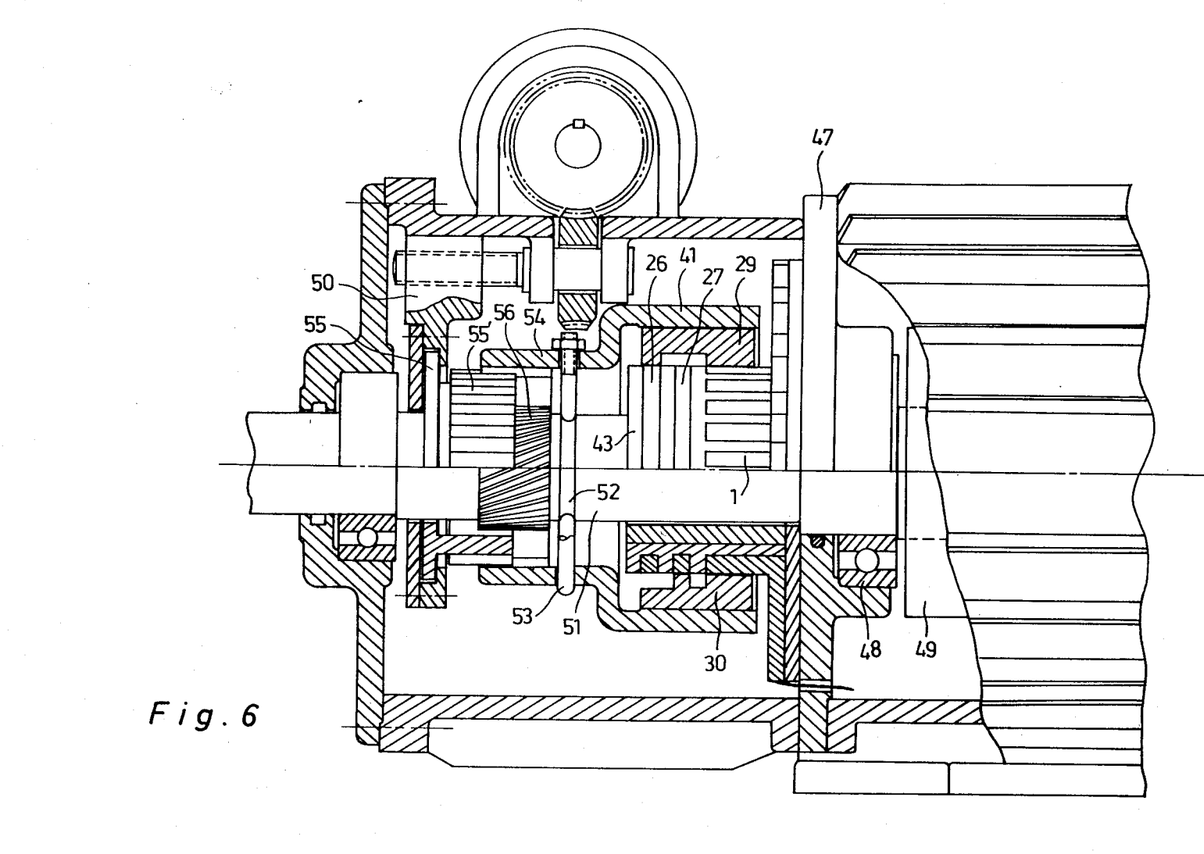
FIG. 6 is a cut-away view of the commutator and brush pair assembly of a practical example of a CDM drive motor designed according to this invention.
Figure 7:
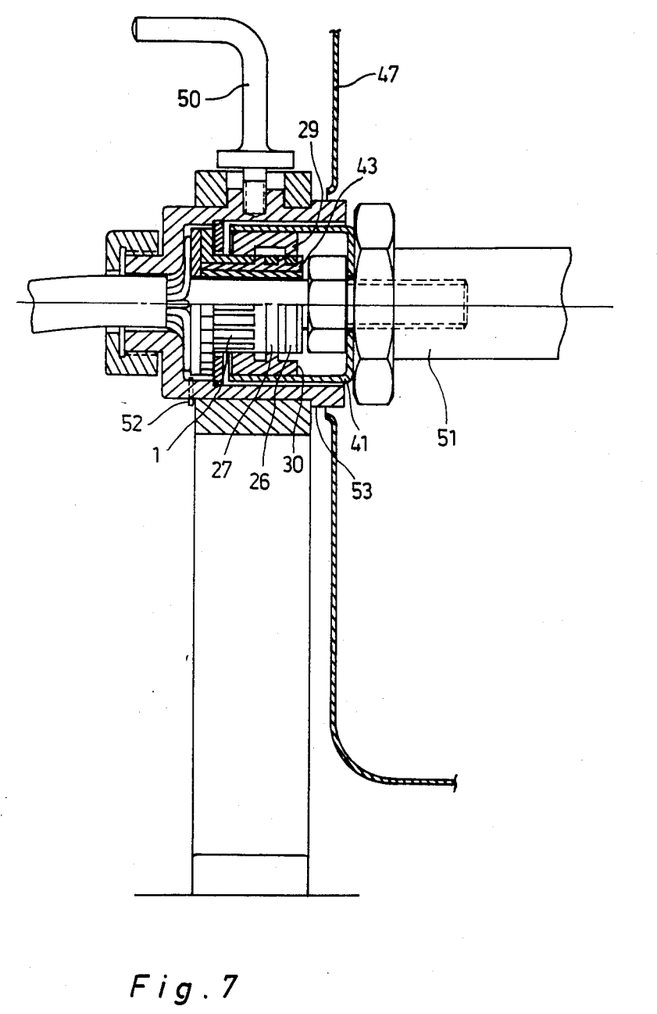
FIG. 7 is a cut-away view of the commutator and brush pair assembly of another practical example of the CDM drive motor designed according to this invention.

FIG. 2 is the illustrating diagram of the mechanical CDM commutator to match the CDM synchronous motor of FIG. 1. This commutator has 10 pairs of (or 20) conductor segments 1, 2, 3, . . . , 20, every two neighbering conductor segments are mutually insulated by a insulater 25 between them. There are also two sliprings 26 and 27 which are connected to the direct current power source 28 with the positive slipring 26 connected to the positive terminal of 28, and the negative slipring 27 to the negative terminal of 28. By the switching of a pair of two brushes 29 and 30, fixed-voltage DC power is fed into the subwindings in each phase of the motor armature in a sequence determined by the structural design of the CDM motor system. The two brushes, positive 29 and negative 30, are positioned on the peripheral surface of the commutator in a position opposite to each other and mutually spaced 180 degrees apart. Both the brushes contact the segment section of the commutator, but each of them contacts only one slipring, i.e., positive brush 29 contacts slipring 26 and negative brush 30 contacts slipring 27. The two sliprings are insulated from each other, and are also insulated from the twenty conductor segments. Notice that each brush has a brush width of three conductor segments in this embodiment as is shown in FIG. 2. FIG. 3 shows a perspective view of the mechnical CDM commutator of this embodment, and FIG. 4 is its side view which also shows the two brushes. The essential details of the commutator structure and the relative position of the two brushes, together with the contacts between the commutator and brushes, can be seen clearly in FIGS. 3 and 4. In these two figures, 26 and 27 are positive and negative sliprings respectively, 1 is one of the conductor segments, and 25 is one of the insulations between the conductor segments. In FIG. 4, 29 is the positive brush and 30 is the negative brush. Two different practical examples of the mechanical CDM commutator-brush assembly design details are shown in FIGS. 6 and 7 which will be described later.

The connecting arrangement of the subwinding terminals to the CDM commutator can be seen through the labelings of the segments in FIG. 2. Notice that the two terminals of every subwinding are connected respectively to two opposite conductor segments spaced 180 degrees apart. For example, terminal A1a of subwinding A1 is connected to segment 1 while terminal A1b is connected to segment 11; terminal B3a of subwinding B3 is connected to segment 8 while terminal B3b is connected to segment 18. Segments 1 and 11, 8 and 18, are opposite segments mutually spaced 180 degrees apart. Notice also that all the six subwindings in the same phase are arranged together, that is, the six "a" terminals of phase A (A1a, A2a, . . . , A6a) are connected to the six consecutive segments starting from segment 1 to 6, and the six "b" terminals of phase A (A1b, A2b, . . . , A6b) are connected to the six consecutive segments starting from segment 11 to 16; the six "a" terminals of phase B (B1a, . . . , B6a) are connected to segments 6 to 11, and the six "b" terminals of phase B (B1b, . . . B6b) are connected to segments 16 to 20 to 1. The two sets of consecutive segments for the two phases are spaced five segments apart, that is, phase A starts by A1a at segment 1 while phase B starts by B1a at segment 6. This means that phase B lags phase A by five segments in twenty segments of one cycle, or, 90 degrees in 360 degrees of one cycle, which is one-fourth of a cycle, just the phase-shift relation of a normal 2-phase motor.

When this mechanical CDM drive is running, the CDM commutator is not rotating but is stationary (fixed to the stator of the motor). It is the two brushes which are attached to the rotor that is rotating, contrary to the conventional dc commutator motors, which have their brushes fixed to the stator and the commutator rotating.

To understand in detail the process of the approximation of the magnetic flux wave $\Phi_{rs}$ to a sine function of time, now suppose the two brushes begin to rotate in a clockwise direction starting from the positions as shown in FIG. 2, that is, prior to start, the positive brush 29 rests on segments 18, 19, and 20, and the negative brush 30 rests on segments 8, 9, and 10. For the sake of clarity, only the description of the sine wave approximation of the magnetic flux of phase A is given hereinbelow, the situation in phase B is simply the same, it merely lags phase A 90 electrical degrees, and the wave shapes produced in the two phases are completely the same.

Prior to start, all the six subwindings of phase A are switched off from the dc power source 28. But when the positive brush 29 comes into contact with segment 1 and the negative brush 30 comes into contact with segment 11, subwinding A1 is switched on, and two of the total ten turns of parallel coils in phase A are activated, which means, the flux $\Phi_{rs}$ produced by phase A changes from the initial 0 unit to 2 units. When the brushes go on and segment 2 is contacted by brush 29, segment 12 by brush 30, subwinding A2 is activated, two more turns of parallel coils in phase A are activated (refer to FIG. 1 for the coil winding arrangements of the subwindings), and $\Phi_{rs}$ produced by phase A changes from 2 to 4 units. When the brushes go further on and segment 3 is contacted by brush 29 and segment 13 by brush 30, subwinding A3 is activated and the number of activated parallel coils in phase A increases to 5, and $\Phi_{rs}$ increases to 5 units. Note that at this moment, the positive brush 29 rests on segments 1, 2, and 3, and the negative brush 30 on segments 11, 12, and 13, and the three subwindings A1, A2, and A3 are activated, that's a total of 2+2+1=5 parallel turns in phase A that are activated to produce the required magnetic flux. When the brushes continue to go on, and segment 4 is contacted by brush 29, segment 14 by brush 30, then subwinding A4 is activated and $\Phi_{rs}$ increases from 5 to 6 units. The brushes go further on, when segment 5 contacts the leading edge of brush 29 and segment 1 leaves the trailing edge of brush 29, and when segment 15 contacts the leading edge of brush 30 and segment 11 leaves the trailing edge of brush 30, the two parallel turns of coil of subwinding A5 is activated while the two parallel turns of coil of subwinding A1 is dis-activated simultaneously, which keeps the number of activated parallel coils at 6 turns, and consequently $\Phi_{rs}$ also remains at 6 units. After the brushes travel the distance of one segment, the activated parallel coils remain at 6 turns. One more segment later, when segment 7 contacts the leading edge of brush 29 and segment 3 leaves the trailing edge of brush 29 completely, and when segment 17 contacts the leading edge of brush 30 and segment 13 leaves the trailing edge of brush 30 completely, the number of activated parallel coils decreases to 5 turns, and $\Phi_{rs}$ also reduces to 5 units. When brush 29 starts to contact segment 8, the number decreases to 4 turns and $\Phi_{rs}$ reduces to 4 units. So the brushes continue to go on until when brush 29 starts to contact segment 10, then the number of activated coils becomes 0 turn and $\Phi_{rs}$ produced by phase A also becomes 0 unit.

Now let the brushes go on, when brush 29 starts to contact segment 11 and brush 30 starts to contact segment 1, the above-described process of variation of the magnetic flux $\Phi_{rs}$ starts again. The whole process is completely the same as is ten segments before except that the polarity is reversed, because the positions of the two brushes are in a situation contrary to their positions ten segments before.

Figure 9:
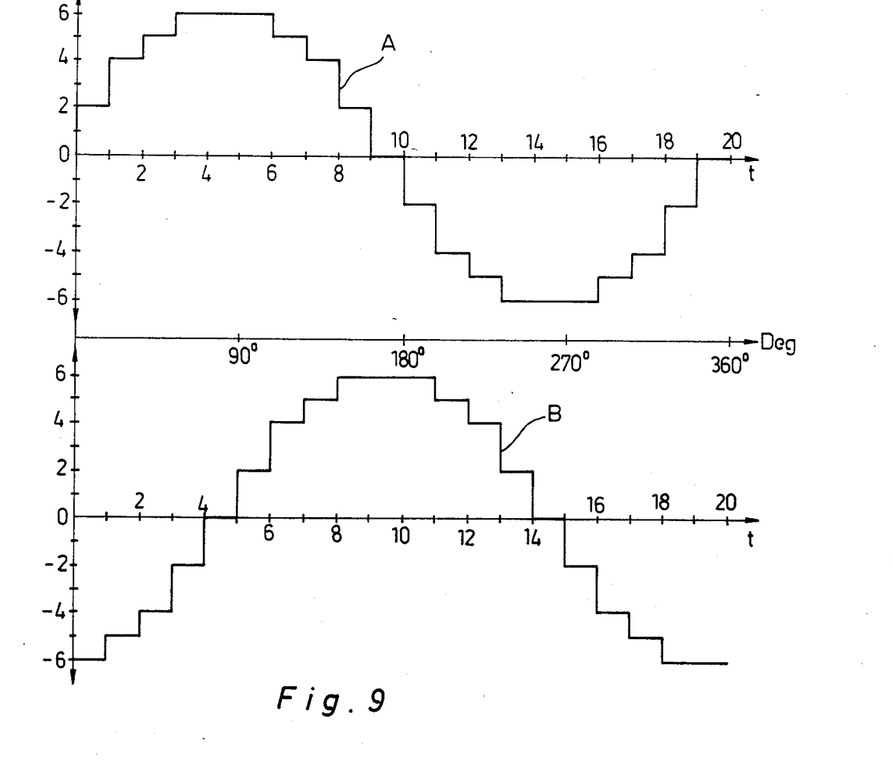
FIG. 9 shows, as functions of time, the magnetic flux waves resulted in the two phases of the synchronous CDM motor of FIG. 1 when switched by the mechanical CDM commutator of FIG. 2 in the time interval of one complete cycle.

Thus, when the two brushes complete one revolution of 20 segments, the magnetic flux waves produced in phases A and B will each make a variation of one complete cycle as shown in Table 1. What is in Table 1 is a 20-step approximation of the magnetic flux waves to the sine function, and FIG. 9 shows this approximation of one complete cycle as function of time, in which the horizontal axes are time and one cycle is devided into 20 steps, and the vertical axis is magnetic flux, its scale is "unit", and, another horizontal axis is the scale of electrical degrees D. In this figure, the approximated magnetic flux wave of phase B is shown to lag the wave of phase A by 5 steps, or 90 electrical degrees.

TABLE 1

| Segment contacted by leading edge of + brush | Segment contacted by leading edge of − brush | Unit magnetic flux in phase A | Unit magnetic flux in phase B |
|---|---|---|---|
| 1 | 11 | 2 | −6 |
| 2 | 12 | 4 | −5 |
| 3 | 13 | 5 | −4 |
| 4 | 14 | 6 | −2 |
| 5 | 15 | 6 | 0 |
| 6 | 16 | 6 | 2 |
| 7 | 17 | 5 | 4 |
| 8 | 18 | 4 | 5 |
| 9 | 19 | 2 | 6 |
| 10 | 20 | 0 | 6 |
| 11 | 1 | −2 | 6 |
| 12 | 2 | −4 | 5 |
| 13 | 3 | −5 | 4 |
| 14 | 4 | −6 | 2 |
| 15 | 5 | −6 | 0 |
| 16 | 6 | −6 | −2 |
| 17 | 7 | −5 | −4 |
| 18 | 8 | −4 | −5 |
| 19 | 9 | −2 | −6 |
| 20 | 10 | 0 | −6 |

As is described hereinabove, the positive and negative two brushes rotate together with the rotor of the CDM motor, and the subwindings of the two phases of the CDM motor armature are parallelly switched on to and off from the DC power source in a proper sequence that will produce a sine-approximated magnetic flux wave in each phase. With one wave lagging the other 90 electrical degrees, a rotating magnetic field is produced in the armature of the CDM motor to propel the motor.

Since the brush pair is stationary relative to motor rotor, and the rotation of the switched rotating magnetic field also synchronizes the rotation of rotor, therefore, by adjusting the angle between the brush-pair axis and the rotor field axis, or by adjusting the angle between the commutator axis and the motor stator axis, the torque produced by the motor can be controlled. This is the Power Angle Control which will be described hereinbelow.

Figure 5:
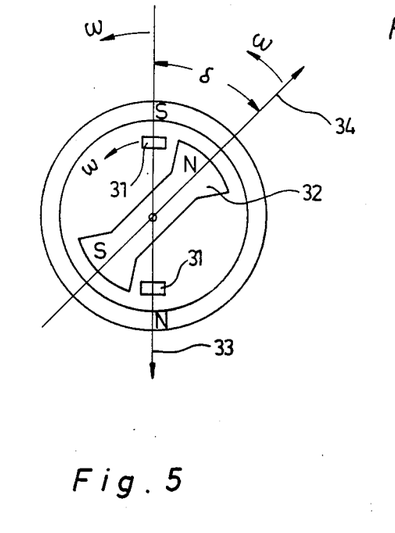
FIG. 5 illustrates the principle of Power Angle Control—PAC of an exemplary synchronous CDM motor.

The principle of Power Angle Control—PAC is shown in FIG. 5, in which a mechanical CDM synchronous motor with permanent magnet rotor is used for explanation. In the figure, 31 are brushes, 32 is rotor magnet, 33 is the rotating magnetic flux vector synthesized from rotor field vector 34 and the switched armature rotating magnetic field vector. The angle δ between vectors 33 and 34 is the Power Angle. If the angle between the brush pair axis and the stator axis is adjusted by some control means, then angle δ also is adjusted, and motor torque T is therefore adjusted. If δ is adjusted to be 0, then motor torque produced will also be 0. If δ is increased, motor torque T is also increased, and motor speed will also be increased. If δ is decreased, motor torque T is also decreased, and motor speed will also be decreased. If the angle δ is reduced to 0 and is then increased in the other direction, then motor will retard, stop, and then start to rotate in the other direction. Thus, the start, stop, acceleration, deceleration, and speed and direction of rotation of the CDM motor are easily controlled by simply controlling δ, the power angle, which can be done simply by controlling a lever. Two substantial designs of the commutator-brush-pair assembly of mechanical CDM motor are shown in FIGS. 6 and 7 which apply the principle of Power Angle Control for CDM motor speed control.

The same numerals in FIGS. 6 and 7 represent the same parts or parts with similar functions, in which 41 is the brush cage, for securing the brushes at the correct positions on the surface of the commutator; 29 and 30 are brushes, notice that 29 is positive brush which contacts positive slipring 26, 30 is negative brush which contacts negative slipring 27; 43 is the commutator, on which there are 26 and 27 two sliprings and segments 1; 47 is the motor frame; 48 the rotor bearing; 49 the rotor; and 51 the rotor shaft—the motor output shaft.

The difference between the mechanisms of FIGS. 6 and 7 is that the mechanism of FIG. 6 controls the relative position between the brush pair and the rotor while the mechanism of FIG. 7 controls the relative position between the commutator and the motor frame. To control the CDM motor by applying the mechanism of FIG. 6, control lever 50 should be shifted in the directions parallel to the rotor axis, to control the CDM motor by applying the mechanism of FIG. 7, control lever 50 should be shifted in the direction of rotor rotation. When the control lever 50 is shifted in the direction parallel to the rotor axis, sleeve 55 moves along, and the helical engaging teeths 56 at the inner surface of the sleeve 55 which engages with the helical engaging teeths at the surface of the rotor shaft, and the sleeve 55 will itself turn an angle relative to the rotor shaft. The amount of the angle that the sleeve 55 is turned relative to the rotor shaft depends on the amount the sleeve 55 itself being shifted axially. While the sleeve 55 is turned, the axial engaging teeths 55' at its outer surface engage with the axial engaging teeth at the inner surface of the brush cage sleeve 54, the brush cage itself will be turned an angle relative to the rotor shaft together with the rotation of the sleeve 55. The rib 53 on the rotor shaft engages with the recess 52 on the brush cage restricts axial movement of the brush cage to secure correct engagement of the brushes and the commutator. Therefore, by shifting the control lever 50, the relative position of the brushes and the rotor shaft can be changed no matter the motor is running or stopped, the power angle and therefore the motor torque is thus controlled.

The brushes of the mechanism of FIG. 7 are secured to the rotor shaft, what is controlled is the position of the commutator relative to the motor frame. In the figure the control lever is fixed to the commutator, the shift of the control lever in the direction of rotor rotation directly brings the commutator to turn along, in which 52 is the hub extended from the commutator which engages with the recess 53 on the motor frame, and the commutator can not move in the axial direction, and the correct engagement of the brushes and the commutator is maintained.

The two designs shown in FIGS. 6 and 7 as described above control the speed of the mechanical CDM motor simply by controlling the control lever of the mechanisms. The start, stop, acceleration, and deceleration of the CDM motor can be contolled by adjusting the position of the control lever within the lever shift range, and the complex electronic control circuitries are eliminated, which is an adventage for mechanical CDM motor drives.

Figure 8:
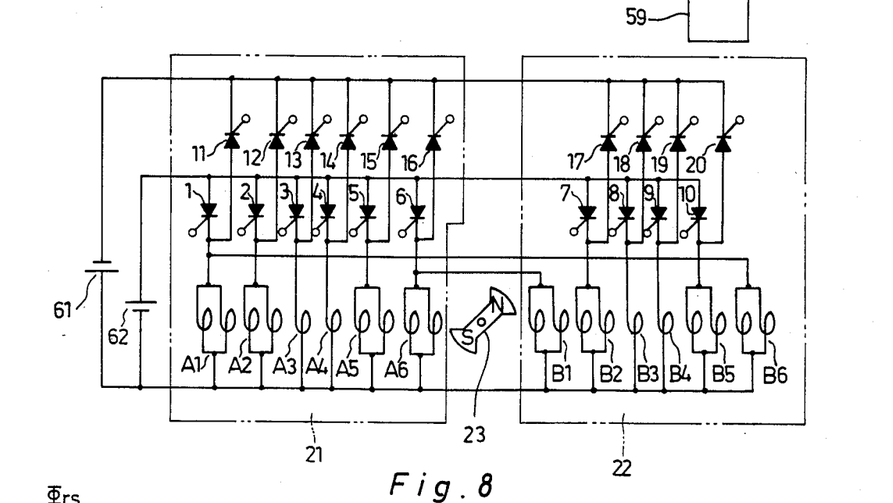
FIG. 8 is a simplified circuit diagram of an electronic CDM drive system applying thyristors instead of conductor segments and brushes of the mechanical CDM drive system.

The examples described above apply mechanical CDM commutators to drive the CDM motors. However, the CDM motors can also be driven by electronic CDM commutators applying thyristors, the semiconductor power devices. FIG. 8 is a simplified schematic diagram of an electronic CDM drive system. In this system, the CDM motor is similar to the motor of FIG. 1. The electronic CDM commutator includes 20 silicon controlled rectifiers—SCR's, which are equivalent to the 20 conductor segments of the mechanical CDM commutator in FIG. 2. These 20 SCR's are designated by the same numerals as for the 20 segments, 1, 2, . . . , to 20, since they play the same role for the systems. These 20 SCR's are fired in the same sequence as the 20 segments that are sequentially contacted by the positive or negative brush in the case of the mechanical CDM drive system, which results in the CDM motor armature the same magnetic flux wave shape shown in FIG. 9. These 20 SCR's are fired in the sequence listed in Table 2.

TABLE 2

| Step | Fired SCR | | | |
|---|---|---|---|---|
| 1 | 1 | 2 | 3 | 4 |
| 2 | 2 | 3 | 4 | 5 |
| 3 | 3 | 4 | 5 | 6 |
| 4 | 4 | 5 | 6 | 7 |
| 5 | 5 | 6 | 7 | 8 |
| 6 | 6 | 7 | 8 | 9 |
| 7 | 7 | 8 | 9 | 10 |
| 8 | 8 | 9 | 10 | 11 |
| 9 | 9 | 10 | 11 | 12 |
| 10 | 10 | 11 | 12 | 13 |
| 11 | 11 | 12 | 13 | 14 |
| 12 | 12 | 13 | 14 | 15 |
| 13 | 13 | 14 | 15 | 16 |
| 14 | 14 | 15 | 16 | 17 |
| 15 | 15 | 16 | 17 | 18 |
| 16 | 16 | 17 | 18 | 19 |
| 17 | 17 | 18 | 19 | 20 |
| 18 | 18 | 19 | 20 | 1 |
| 19 | 19 | 20 | 1 | 2 |
| 20 | 20 | 1 | 2 | 3 |
| 1 | 1 | 2 | 3 | 4 |
| . | . | . | . | . |
| . | . | . | . | . |

In FIG. 8, 21 and 22 are the two phases of the CDM motor, 23 is the permanent magnet rotor, 59 is the SCR firing circuitry of the electronic CDM drive system, and 61 and 62 are two DC power sources. Notice that as is listed in Table 2, there are always 4's fired simultaneously, which reflect the point that the brushes in the previous example of the mechanical CDM drive system of FIG. 2 have brush widths of 3 segments.

The commutation by the electronic CDM commutator is easily understood when compared to the communtation by the mechanical CDM commutator described previously. They are essentially equivalent, only that one applies mechanical contact for power switching, while the other applies thyristors controlled by gate signals for power switching.

For the drive systems applying either mechanical or electronic CDM commutator, there are various kinds of system element arrangement designs. For instance, the number of conductor segments in the mechanical CDM commutator or the number of SCR's in the electronic CDM commutator, the brush width (in terms of segments) in the mechanical CDM commutator or the number of SCR's fired simultaneously, the number of subwindings in the phases of the CDM motor, the number of turns of parallel coils in the subwindings, and the number of phases of the CDM notor etc., all can be varied according to different designs of the complete system. However, a few things are obvious:

1. The more the conductor segments in the mechanical CDM commutator, or, the more the SCR's in the electronic CDM commutator, the smoother the sine-approximated magnetic flux waves will be.

2. The broader the widths for the brushes of the mechanical CDM commutator, or, the more the SCR's fired simultaneously in the electronic CDM commutator, that is, the more the parallel coils activated simultaneously, the smaller and lighter the CDM motor (compared at the basis of equal power rating) will be.

Figure 10:
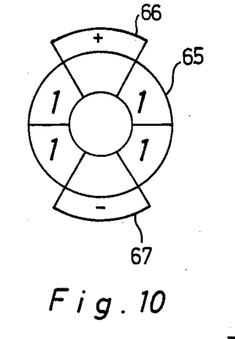
FIG. 10 illustrates the equivalent mechanical CDM commutator with brushes for the conventional six-step drive system.
Figure 11:
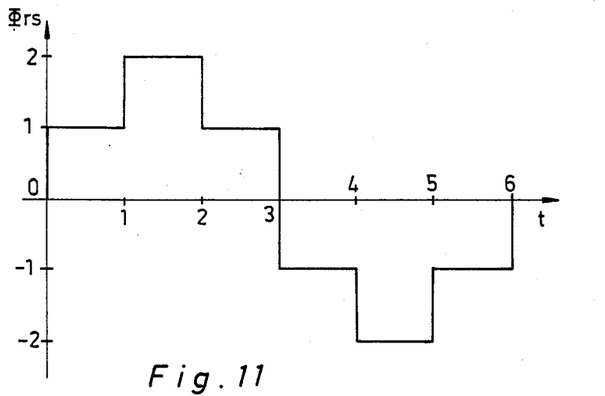
FIG. 11 is the magnetic flux wave switched by the commutator of FIG. 10.
Figure 12:
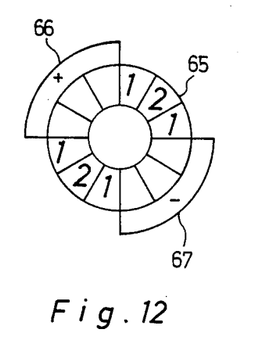
FIGS. 12, 14, 16, and 18 illustrate four kinds of different mechanical CDM commutator and brush pair arrangements; and, FIGS. 13, 15, 17, and 19 are the magnetic flux waves switched by the commutators of FIGS. 12, 14, 16, and 18 respectively.
Figure 13:
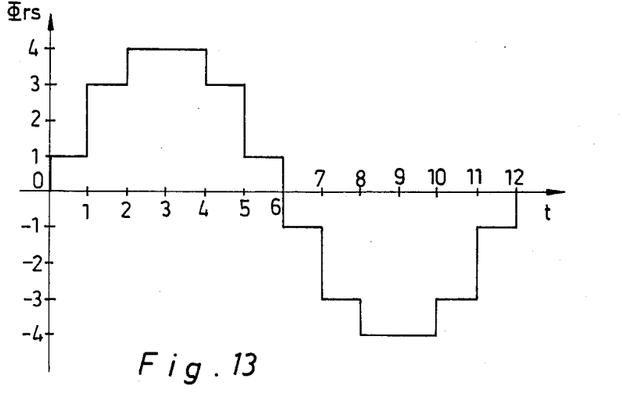
Figure 14:
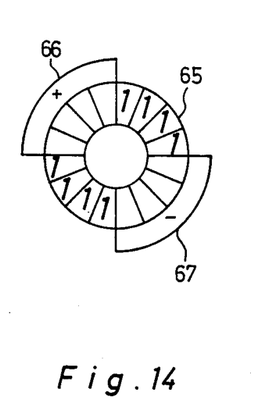
Figure 15:
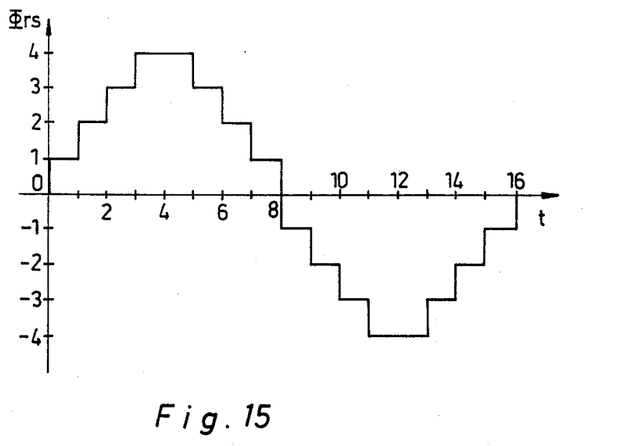
Figure 16:
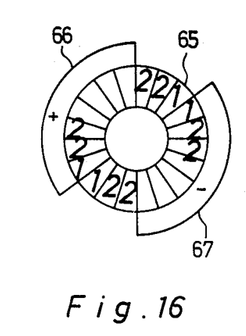

Coil Density Modulation is a method which is broad in range for producing sine-approximated magnetic flux waves in phase windings of motor armature. A few arrangements of the subwindings and brush widths for CDM motors which will result in acceptable sine-approximated magnetic flux waves for motor phase windings are described below. First, for the sake of convenient comparisons, an equivalent mechanical CDM commutator which will produce the magnetic flux wave shapes the same as that produced by the conventional six-step inverters is shown in FIG. 10, in which 4 of the 6 segments are each labeled with an italic 1 to represent that in every phase of this six-step motor, there are 2 subwindings and, that the ratio of turns of parallel coils in the 2 subwindings is 1 to 1. Notice that the brush width is 1 segment. The $\Phi_{rs}$ wave form switched by this six-step-equivalent commutator is shown in FIG. 11 which is just the wave form of the conventional six-step method.

FIGS. 12, 14, 16, and 18 show 4 different kinds of subwinding and brush width arrangements, and FIGS. 13, 15, 17, and 19 show respectively the wave shapes switched. There are too many arrangements to be listed herein, hence only a few are selected for the purpose of comparisons. In FIGS. 10, 12, 14, 16, and 18, 65's are commutators, 66's are positive brushes, and 67's are negative brushes.

Table 3 lists performance comparisons of some selected arrangements. What are listed are the harmonic contents of the selected wave shapes from the fundamental to the 60th harmonic, which are obtained by analyzing the step-approximated wave shapes by Fourier Analysis using an Apple II computer. Notice that the harmonics are expressed as percent of the value of the fundamental, that is, fundamental is 100% as seen in Table 3.

TABLE 3

| Number of Seg/SCR | 6/6 | 12/12 | 16/16 | 20/20 | 20/20 | 24/24 | 30/30 |
|---|---|---|---|---|---|---|---|
| Brsh wdth/fire SCR | 1/2 | 3/4 | 4/5 | 7/8 | 5/6 | 6/7 | 11/12 |
| Subwindgs per phase | 2 | 3 | 4 | 6 | 5 | 6 | 9 |
| Coils per subwindg | 1:1 | 1:2:1 | 1:1:1:1 | 2:2:1:1:2:2 | 1:2:2:2:1 | 1:1:1:1:1:1 | 2:2:2:1:1:1:2:2:2 |
| Type name | 6-step/E312.11 | A633.121 | B844.1111 | C1076.221122 | A1055.12221 | B1266.111111 | C15119.222111222 |
| HARMONICS % fundamental | | | | | | | |
| 1 | 100.% | 100.% | 100.% | 100.% | 100.% | 100.% | 100.% |
| 2 | .05 | .07 | .07 | .06 | .08 | .07 | .06 |
| 3 | | .04 | 2.78 | 1.02 | 6.44 | 5.52 | 1.00 |
| 4 | .04 | .03 | .01 | .02 | .02 | .01 | .02 |
| 5 | 20.01 | 1.45 | 5.53 | .01 | .02 | 5.35 | .02 |
| 6 | .01 | | .02 | .01 | .01 | .02 | .01 |
| 7 | 14.27 | 1.02 | 1.89 | .23 | .70 | .37 | .19 |
| 8 | .05 | .02 | .01 | | .01 | .01 | .01 |
| 9 | .01 | .03 | 1.48 | 1.76 | .29 | 1.82 | 1.45 |
| 10 | .04 | .06 | .01 | .02 | | .01 | .02 |
| 11 | 9.10 | 9.11 | 2.52 | 1.43 | .23 | .91 | 1.04 |
| 12 | .01 | .01 | .01 | | | .01 | .01 |
| 13 | 7.67 | 7.66 | .61 | .12 | .39 | .77 | .07 |
| 14 | .05 | .07 | .06 | .01 | | | .01 |
| 15 | .01 | .04 | 6.68 | .01 | .01 | 1.09 | .01 |
| 16 | .04 | .03 | .01 | .02 | .01 | .01 | .01 |
| 17 | 5.89 | .44 | 5.85 | .20 | 1.10 | .16 | .06 |
| 18 | .01 | | .07 | .06 | .07 | .01 | .01 |
| 19 | 5.24 | .37 | .46 | 5.25 | 5.28 | 1.41 | .60 |
| 20 | .05 | .02 | .01 | .04 | .01 | .01 | .02 |
| 21 | .01 | .03 | 1.31 | 4.77 | 4.73 | .76 | .60 |
| 22 | .04 | .06 | .02 | .06 | .08 | .06 | |
| 23 | 4.36 | 4.36 | .57 | .13 | .87 | 4.37 | .07 |
| 24 | .01 | .01 | .01 | .02 | .02 | .01 | .01 |
| 25 | 3.98 | 3.97 | .53 | .01 | .02 | 3.97 | .02 |
| 26 | .05 | .07 | .01 | .01 | .01 | .07 | .02 |
| 27 | .01 | .04 | 1.03 | .06 | .17 | .64 | .13 |
| 28 | .04 | .03 | .01 | | .01 | .01 | .06 |
| 29 | 3.46 | .26 | .26 | .55 | .09 | .91 | 3.43 |
| 30 | .01 | | .06 | .02 | | .02 | .04 |
| 31 | 3.20 | .23 | 3.24 | .51 | .08 | .07 | 3.24 |
| 32 | .05 | .02 | .01 | | | .01 | .06 |
| 33 | .01 | .03 | 3.00 | .05 | .15 | .49 | .08 |
| 34 | .04 | .06 | .07 | .01 | | .01 | .02 |
| 35 | 2.86 | 2.87 | .27 | .01 | .01 | .28 | .02 |
| 36 | .01 | .01 | .01 | .02 | .01 | .01 | .01 |
| 37 | 2.68 | 2.67 | .74 | .10 | .49 | .27 | .03 |
| 38 | .05 | .07 | .02 | .06 | .07 | | .01 |
| 39 | .01 | .04 | .33 | 2.55 | 2.58 | .42 | .34 |
| 40 | .04 | .03 | .01 | .04 | .01 | .01 | .02 |
| 41 | 2.44 | .19 | .32 | 2.45 | 2.40 | .07 | .28 |
| 42 | .01 | | .01 | .06 | .08 | .01 | .01 |
| 43 | 2.30 | .16 | .64 | .07 | .49 | .63 | .01 |
| 44 | .05 | .02 | .01 | .02 | .02 | .01 | .01 |
| 45 | .01 | .03 | .16 | .01 | .02 | .34 | .01 |
| 46 | .04 | .06 | .06 | .01 | .01 | .06 | .01 |
| 47 | 2.13 | 2.14 | 2.14 | .03 | .09 | 2.14 | .03 |
| 48 | .01 | .01 | .01 | | .01 | .01 | .01 |
| 49 | 2.01 | 2.01 | 2.01 | .33 | .06 | 2.01 | .23 |
| 50 | .05 | .07 | .07 | .02 | | .07 | .02 |
| 51 | .01 | .04 | .19 | .30 | .05 | .35 | .24 |
| 52 | .04 | .03 | .01 | | | .01 | |
| 53 | 1.89 | .15 | .51 | .03 | .10 | .49 | .03 |
| 54 | .01 | | .02 | .01 | | .02 | .01 |
| 55 | 1.79 | .13 | .23 | .01 | .01 | .04 | .02 |

TABLE 3-continued

| | | | | | | | |
|---|---|---|---|---|---|---|---|
| 56 | .05 | .02 | .01 | .02 | .01 | .01 | .02 |
| 57 | .01 | .03 | .23 | .07 | .31 | .28 | .07 |
| 58 | .04 | .06 | | .06 | .07 | .01 | .06 |
| 59 | 1.70 | 1.71 | .47 | 1.68 | 1.71 | .16 | 1.68 |
| 60 | .01 | .01 | .01 | .04 | .01 | .01 | .04 |

Through comparing the harmonic contents of the various arrangements, the performances can be justified. Although the approximated stepping magnetic flux waveforms may be smoothed when they are applied to the armature windings of the CDM motors due to the fact that the coils of motor windings are kinds of energy storing devices. The wave shapes will be different from the stepping waveforms, maybe smoother, however, comparing the harmonic contents of the switched magnetic flux waveforms obtained by Fourier Analysis is a fairly reasonable method of justifying the performances of the various arrangements. Column 1 of Table 3 lists the analyzed harmonic contents of the wave shape of the conventional six-step method for the purpose of comparison. Columns 2, 3, and 4 are the harmonic contents of the wave shapes produced by the arrangements of FIGS. 12, 14, and 16 respectively, that is, the wave shapes shown in FIGS. 13, 15, and 17 respectively. Columns 5, 6, and 7 list the harmonic contents of still another 3 kinds of arrangement. First row of Table 3 "Number of Seg/SCR" means the number of conductor segments in the mechanical CDM commutator or the number of SCR's in the electronic CDM commutator, which also is the number of steps in a cycle that the CDM motor undergoes. Second row "Brsh wdth/fire SCR" means the brush width for the mechanical commutator or the number of SCR's fired simultaneously for the electronic commutator, and, "Brsh wdth"+1="fire SCR", which also is the number of subwindings in each phase activated simultaneously. Third row "Subwindgs per phase" means the number of subwindings in each phase of the CDM motor. Fourth row "Coils per subwindg" shows the ratio of the number of parallel coils for each subwinding in each phase of the motor. Fifth row "Type name" is the type names of the various wave shapes which are given for designation, for example, C1076.212, B844.1, etc..

Until now, the elementary principles and practical examples of the Coil Density Modulation method of motor control have been described to certain extent, in the following, a comparison between the CDM method of this invention and the conventional method of motor speed control (the CVM method referred to in this specification) will be made.

Figure 17:
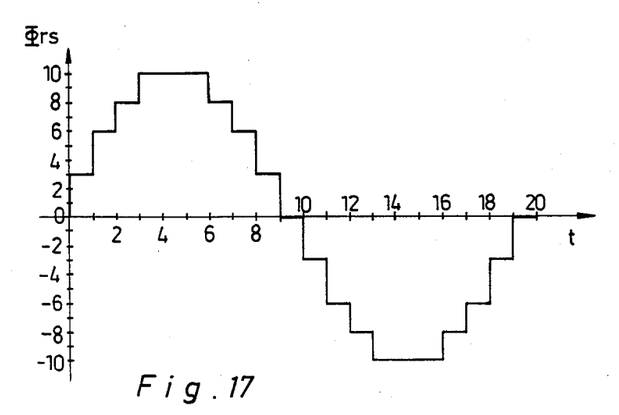
Figure 18:
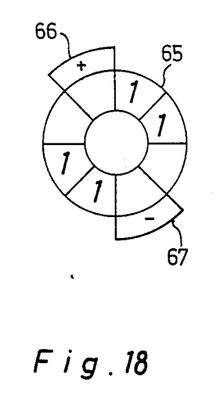
Figure 19:
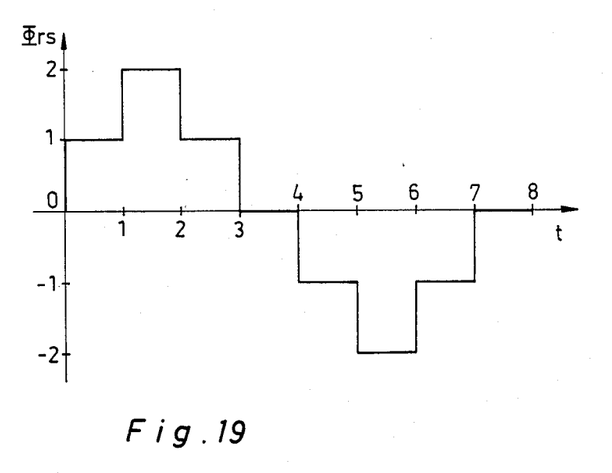

For AC variable-frequency drive systems, one important aspect concerning how their performance are justified is how fine their switched magnetic flux waveforms can approximate the perfect sine waveform. One simple and reasonable method of justification is to examine the harmonic contents of the switched sine-approximated magnetic flux waveforms as mentioned and listed hereinabove in Table 3. From Table 3 it can be observed, the strength of the 5th harmonic of the six-step waveform is greater than 20% of its fundamental, and the 7th harmonic is greater than 14%, while for the C1076.212 CDM system waveform listed in column 4, the greatest 19th harmonic, reaches only 5.25% of its fundamental. This is no surprise, which can be understood if the wave shape of the C1076.212 arrangement in FIG. 17 is compared with the wave shape of the six-step method in FIG. 11, it is simply because that the approximation to the desired sine waveform of the C1076.212 waveform is much better than the approximation of the six-step method waveform. If the C15119.212 arrangement is selected, the greatest 29th harmonic is only 3.43% of its fundamental, which is a further better approximation.

Applying the mechanical CDM commutator for drive system to replace the conventional six-step or PWM thyristor circuit results in volume and weight reduction for the system. In the conventional thyristor drive systems presently available, the power and control circuitries are usually larger than the motors themselves. But, when this invention is applied, the whole mechanical CDM commutator can easily be fitted into the motor housing, for which two practical examples are as shown in FIGS. 6 and 7. The size of a mechanical CDM commutator is decided by its brushing angle, that is, the angle of the arc decided by the contact of one brush and the commutator, which is usually between 90 to 130 degrees (for example the brushes in FIG. 16: 7/20 * 360=126 degrees). Therefore, the commutator can be made as small as possible, because the electric power required to be transmitted by every conductor segment is only a fraction of the total power handled by the system. Hence the mechanical CDM commutator of a CDM motor system will never be larger than the commutator of a dc motor with the same power rating, and can be made as small as possible to be fitted into the motor as an entire structure.

From the examples of FIGS. 6 and 7 it can be observed that the control of a mechanical CDM drive system is very simple. Except that the voltage of the DC power source can be controlled seperately, only the control of a control lever is required to adjust the power angle, and the speed and direction of motor rotation are all controlled. This control lever 50 in FIG. 6 or 7 may also be controlled by some servo-mechanism so that the control of the drive system is fully automated.

When an electronic CDM commutator is applied, the electric power required to be handled by every power thyristor of the commutator is only a fraction of the total power handled by the system, which differs from the cases of the conventional thyristor drive systems such as the six-step or PWM systems, in which every thyristor is required to handle full system power. For example, if the electronic CDM drive system in FIG. 8 adopts the thyristor control procedure of type C1076.212, which has its SCR firing sequence listed in Table 4, then, since there are mostly 8 thyristors fired and hence 8 subwindings activated at most instances, therefore, every SCR only has to handle a fraction of the system power. Thus, as compared to a CVM drive system with the same power rating as the CDM system, although the number of thyristors required is increased for the CDM design, the power handling capabilities required, however, are decreased, and the thyristors selected can be of much smaller power ratings.

TABLE 4

| Step | Fired SCR | | | | | | | |
|---|---|---|---|---|---|---|---|---|
| 1 | 1 | 2 | 3 | 4 | 5 | 6 | 7 | 8 |

TABLE 4-continued

| Step | Fired SCR | | | | | | | |
|---|---|---|---|---|---|---|---|---|
| 2  | 2  | 3  | 4  | 5  | 6  | 7  | 8  | 9  |
| 3  | 3  | 4  | 5  | 6  | 7  | 8  | 9  | 10 |
| 4  | 4  | 5  | 6  | 7  | 8  | 9  | 10 | 11 |
| 5  | 5  | 6  | 7  | 8  | 9  | 10 | 11 | 12 |
| 6  | 6  | 7  | 8  | 9  | 10 | 11 | 12 | 13 |
| 7  | 7  | 8  | 9  | 10 | 11 | 12 | 13 | 14 |
| 8  | 8  | 9  | 10 | 11 | 12 | 13 | 14 | 15 |
| 9  | 9  | 10 | 11 | 12 | 13 | 14 | 15 | 16 |
| 10 | 10 | 11 | 12 | 13 | 14 | 15 | 16 | 17 |
| 11 | 11 | 12 | 13 | 14 | 15 | 16 | 17 | 18 |
| 12 | 12 | 13 | 14 | 15 | 16 | 17 | 18 | 19 |
| 13 | 13 | 14 | 15 | 16 | 17 | 18 | 19 | 20 |
| 14 | 14 | 15 | 16 | 17 | 18 | 19 | 20 | 1  |
| 15 | 15 | 16 | 17 | 18 | 19 | 20 | 1  | 2  |
| 16 | 16 | 17 | 18 | 19 | 20 | 1  | 2  | 3  |
| 17 | 17 | 18 | 19 | 20 | 1  | 2  | 3  | 4  |
| 18 | 18 | 19 | 20 | 1  | 2  | 3  | 4  | 5  |
| 19 | 19 | 20 | 1  | 2  | 3  | 4  | 5  | 6  |
| 20 | 20 | 1  | 2  | 3  | 4  | 5  | 6  | 7  |
| 1  | 1  | 2  | 3  | 4  | 5  | 6  | 7  | 8  |
| 2  | 2  | 3  | 4  | 5  | 6  | 7  | 8  | 9  |
| .  |    |    |    |    | .  |    |    |    |
| .  |    |    |    |    | .  |    |    |    |
| .  |    |    |    |    | .  |    |    |    |

As a conclusive comparison, the following adventages are obvious if the Coil Density Modulation drive systems are used to replace the conventional AC variable-frequency drive systems:

1. Reduced system volume and weight, reduced control circuitry complexity, and reduced system cost.
2. Improved system performances.

The embodiments according to this invention described hereinabove are used to specify this invention not to limit this invention. Any one skilled in this art can make modifications and changes the like which should be included in the spirit and scope of this invention.

I claim:

1. A variable speed, self-commutating motor comprising:
   (a) a rotor;
   (b) a stator including multiple sets of phase windings for polyphase operation, each said phase winding comprising at least one subwinding; and
   (c) communtating means including a plurality of commutator segments connected to said subwindings, different ones of said segments being connected to differing numbers of said subwindings, a pair of slip rings and a pair of brushes, said commutator segments and slip rings being fixed to said stator, said brushes being fixed to and rotating together with said rotor, each said brush contacting one of said slip rings and a plurality of adjacent ones of said commutator segments simultaneously;
   (d) one terminal of any said subwinding being directly connected to one said commutator segment, the other terminal being directly connected to another commutator segment, one of said slip rings being connected to the positive terminal of a direct-current power source, and the other slip ring being connected to the negative terminal of said power source to energize the subwindings by sequentially connecting to said power source by the simultaneous contact of said slip rings and the respective commutator segments by said brushes, and to thereby cause said rotor and stator to rotate with respect to each other.

2. The motor of claim 1 wherein said brushes are disposed in either side by said rotor approximately 180 degrees with respect to each other.

3. The motor of claim 1 wherein the subwindings in each phase are disposed physically parallel to each other.

4. The variable speed motor of claim 1, wherein said subwindings commutating means are arranged such that a magnetic flux wave is synthesized in each of said phase windings which approximate a sine wave to produce a rotating magnetic field that drives said rotor.

5. The variable speed motor as claimed in claim 1, wherein said commutating means is arranged so that the minimum number of subwindings which are connected at any given time are at least four in number and wherein the maximum number of subwindings which are connected at any given time are approximately 50 percent greater than the minimum number.

6. Apparatus for variable speed motor drive applications which apparatus comprises:
   (a) a rotor;
   (b) a stator including muliple sets of phase windings for polyphase operation, each said phase winding comprises at least one subwinding; and
   (c) commutating means comprising a plurality of semi-conductor switching devices connected to said subwindings, different ones of said switching devices being connected to differing numbers of said subwindings and a control circuit for controlling the switching sequence of said semiconductor devices, whereby any said subwinding is connected to at least one of said semiconductor switching devices to energize the subwindings by sequentially switching onto a direct-current power source by said semiconductor switching devices, said control circuit timing a selecting of the semiconductor switching devices, and the subwindings being physically arranged to synthesize a magnetic flux wave that approximates a sine wave to produce a rotating magnetic field that drives said rotor.

7. The motor of claim 6 wherein the subwindings in each phase are disposed physically parallel to each other.

8. The variable speed motor as claimed in claim 6, wherein said commutating means is arranged so that the minimum number of subwindings which are connected at any given time are at least four in number and wherein the maximum number of subwindings which are connected at any given time are approximately 50 percent greater than the minimum number.

9. A method of driving the rotor of a variable speed, self commutating motor using a d.c. power supply, said motor including a stator having a plurality of phase windings for polyphase operation, said phase windings including differing numbers of separate subwindings, said method comprising the steps of connecting a first given number of said phase windings and a second given number of said subwindings to said power supply to cause said rotor to rotate with respect to said stator an incremental amount and thereafter connecting a third given number of said phase windings and a fourth given number of said subwindings to said power supply to cause further rotation of said rotor, said first and third numbers being equal and said second and fourth numbers being greater than zero, but different from each other.

10. A method of generating a magnetic flux wave in each phase winding of the stator of a polyphase motor, said method comprising the steps of directly connecting phase windings to a power supply and varying, in a predetermined sequence, the number of turns of each phase winding which are directly connected to the power supply so that the magnetic flux wave generated by the sequentially energized coils approximates a sine wave.

* * * * *